United States Patent [19]

Weir

[11] Patent Number: 4,922,073

[45] Date of Patent: May 1, 1990

[54] THICK TUBE WELDER

[75] Inventor: David J. Weir, Burbank, Calif.

[73] Assignee: Astro ARC Company, Sun Valley, Calif.

[21] Appl. No.: 393,940

[22] Filed: Aug. 15, 1989

[51] Int. Cl.[5] ............................................. B23K 9/225
[52] U.S. Cl. ............................. 219/60 A; 219/125.11
[58] Field of Search ...................... 219/60 A, 61, 60.2, 219/125.11

[56] References Cited

U.S. PATENT DOCUMENTS 3,194,936 7/1965 Rohrberg et al. ................ 219/60 A Primary Examiner—Clifford C. Shaw
Attorney, Agent, or Firm—Jack C. Munro

[57] ABSTRACT

A thick tube welder for welder together a tubular end fitting and a tube. The end fitting and the tube are placed in axial alignment within a welding head housing with the end fitting being located in a mounting housing. The mounting housing is then fixedly secured to the welding head housing. An inner welding electrode is connected to the mounting housing and is located in alignment with the inner surface of the welding joint. An outer welding electrode is located in alignment with the exterior surface of the welding joint with this electrode being mounted on the welding head housing. Both electrodes are rotatably driven either simultaneously or in sequence in order to create the weld between the tube and the end fitting. Depending on the length of the end fitting, the inner welding electrode is to be adjustable longitudinally relative to the welding joint.

4 Claims, 4 Drawing Sheets

THICK TUBE WELDER

BACKGROUND OF THE INVENTION

The field of this invention relates to welding automatic welding equipment and more particularly to a welder for welding thick walled titanium tubes that are able to withstand a substantial amount of internal fluid pressure over a long period of time without failure.

The welding of titanium in the past has been difficult. Generally, if the titanium is thin walled, such as an eighth of an inch, conventional welding techniques can be employed. However, when the titanium gets thicker, such as about one-quarter of an inch, it becomes more difficult to utilized the conventional welding methods.

Within certain equipment, such as aircraft, titanium is being used to a greater extent. The desirability of using titanium is its high strength and its low weight. In the new aircraft that are currently on the drawing boards, titanium tubing is to be utilized for the hydraulic lines.

These hydraulic lines are under a high pressure, such as eight thousand pounds per square inch. These hydraulic lines are not constructed of a single section of tubing. Instead, these hydraulic lines are constructed of a plurality of replaceable segments with these segments being connected together by connectors. Each end of each segment terminates in an end fitting. Each end fitting is to be welded to its respective end of the tubing. Because of the exceedingly high pressures involved, and also of the fact that the tubing is constantly under vibration, these welds must be of the highest possible quality. There cannot be a flaw in one weld as the entire hydraulic line will become inoperable.

SUMMARY OF THE INVENTION

The structure of the present invention has to do with a welder which is designed specifically for welding end fittings onto a tube. Primarily, the structure of the welder of the present invention is of particular advantage when welding of titanium and more particularly, thick walled titanium. The end fitting is to be matingly located within a receiving chamber of a mounting housing. Being conducted through the end fitting and centrally disposed therein is an inner welding electrode. This welding electrode is to be adjustable axially or longitudinally relative to the end fitting so that the welding electrode can be precisely located at the rearward defined edge of the end fitting. This mounting housing includes a gear driving arrangement which is to rotate the inner welding electrode. The mounting housing also includes appropriate passages to supply electrical energy to the inner welding electrode, inert gas to the tip of the inner welding electrode and appropriate water passages for cooling. This mounting housing is to be fixedly mounted within a welding head housing. The tube that is to be welded to the end fitting is placed within the welding head housing and, when axially aligned with the end fitting and abutting against the rear edge of the end fitting, this tube is tightly clamped in position onto the welding head housing. The welding head housing also includes a rotatable outer welding electrode located exteriorly of the welding joint. Appropriate gearing is to cause rotation of this outer welding electrode. Also, included within the welding head housing is appropriate electrical connection to supply electric energy to the welding electrode as well as inert gas and cooling water.

The primary objective of the present invention is to construct a welder which welds most satisfactorily a specifically designed end fitting to a tube.

Another objective of the present invention is to construct a welder which produces a highest quality weld in the welding of a thick walled titanium end fitting to a thick walled titanium tube.

Another objective of the present invention is to construct a welder which is able to produce the desired welds quickly and easily utilizing operators of minimal welding skill.

DETAILED DESCRIPTION OF THE SHOWN EMBODIMENT

Figure 9:
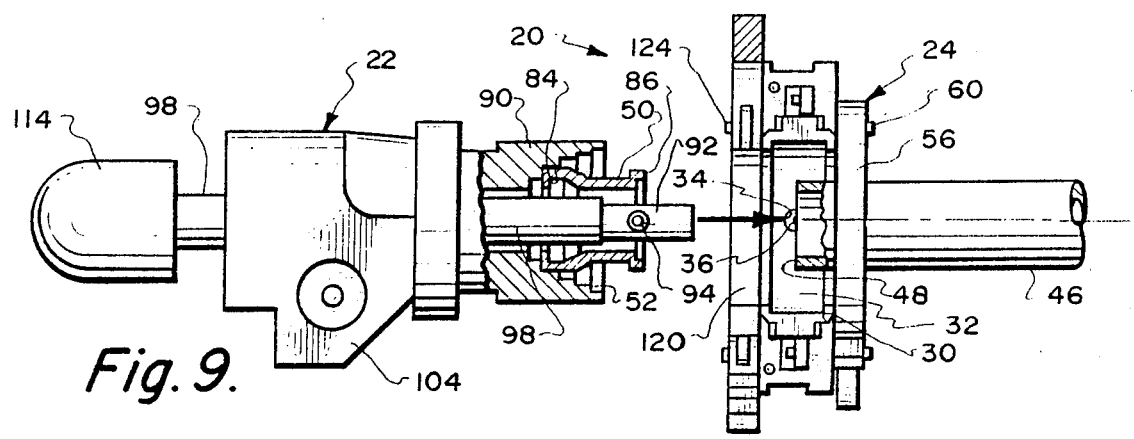
FIG. 9 is a top plan view of the welder of this invention showing the end fitting mounting housing in an about to be installed position with the welding head housing.
Figure 10:
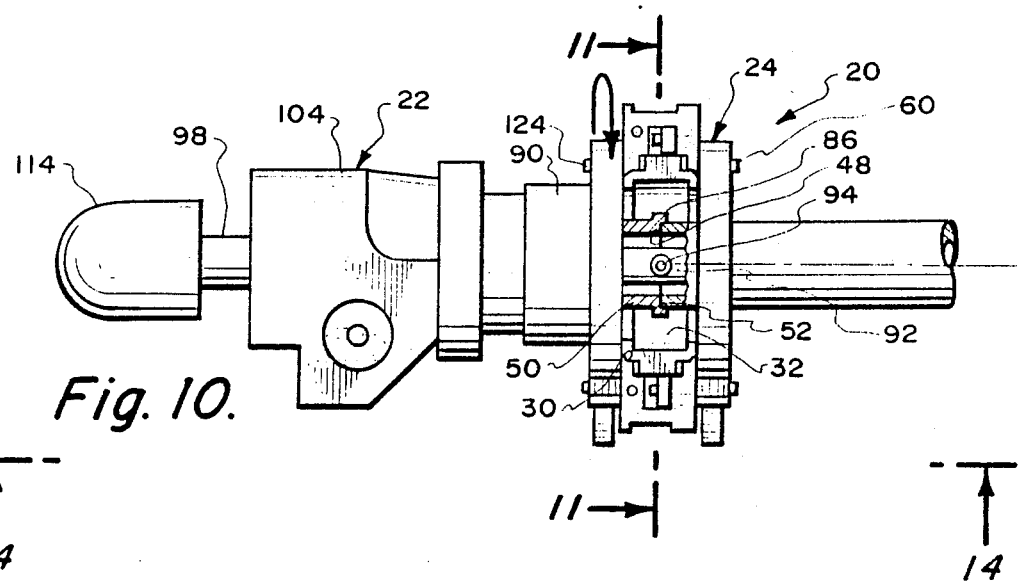
FIG. 10 is a view similar to FIG. 9 but showing the end fitting mounting housing and the welding head housing mounted together.
Figure 11:
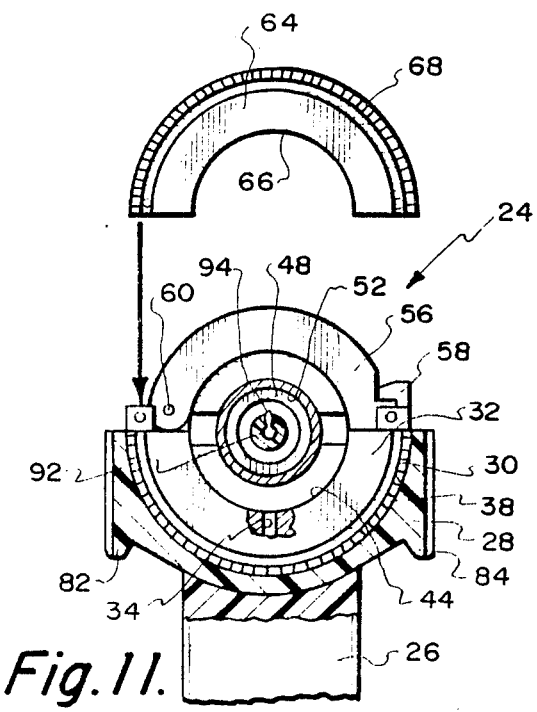
FIG. 11 is a cross-sectional view taken along line 11-11 of FIG. 10 but showing a portion of the separable ring gear separated from the welding head housing.
Figure 12:
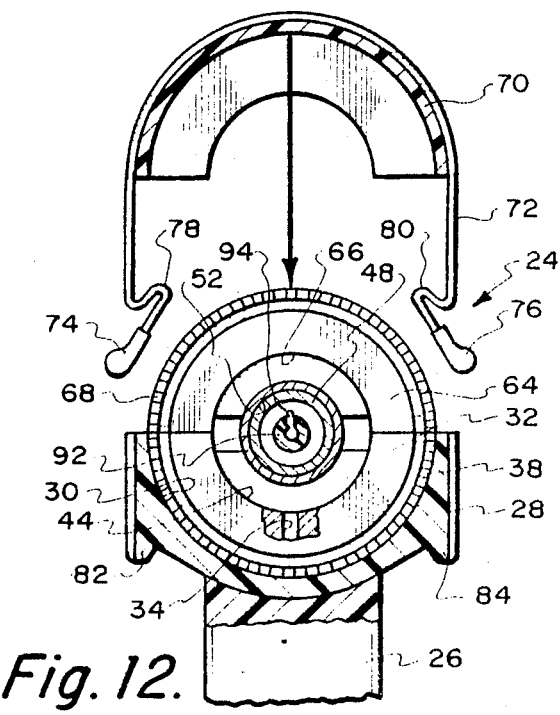
FIG. 12 is a view similar to FIG. 11 but showing the ring gear connected together and the clamping cover which is mounted over the ring gear in an about to be installed position.
Figure 13:
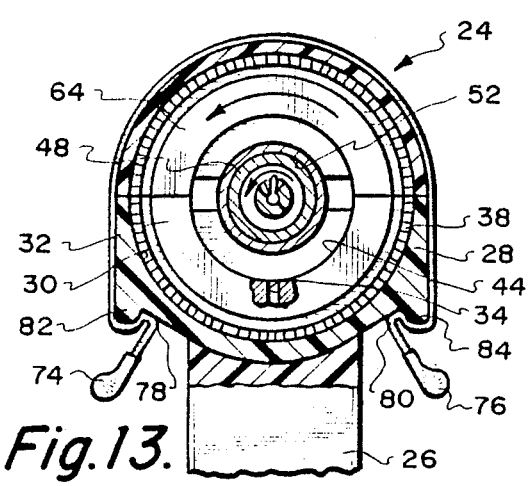
FIG. 13 is a view similar to FIG. 12 but showing the clamping cover in its installed position.
Figure 15:
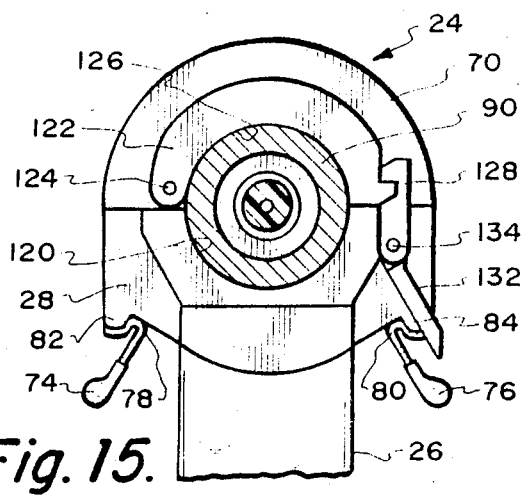
FIG. 15 is a cross-sectional view taken along line 15—15 of FIG. 14.
Figure 14:
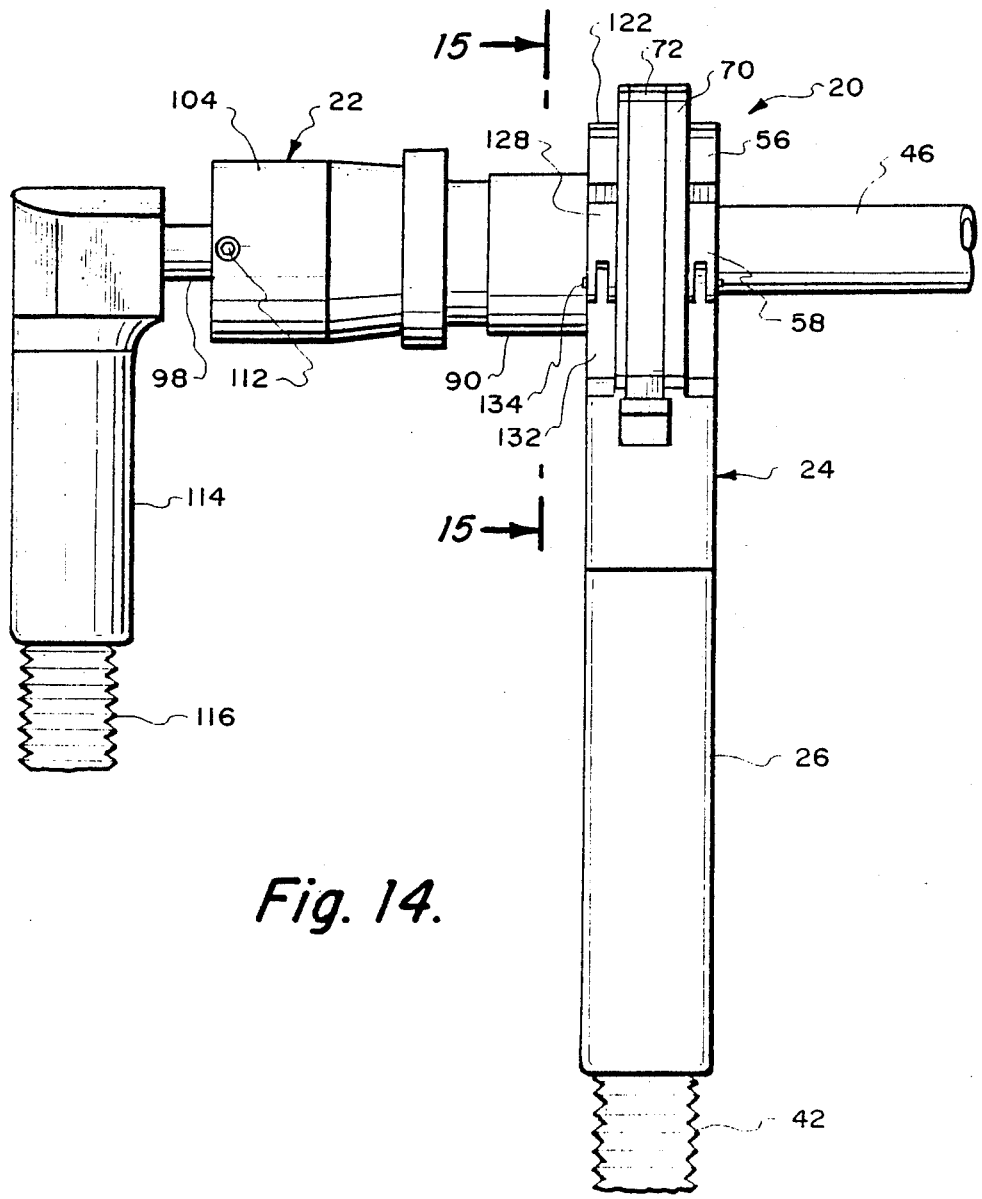
FIG. 14 is a front view of the welder of this invention taken along line 14—14 of FIG. 10.

Referring particularly to the drawings, there is shown in FIGS. 9, 10 and 14 the welder 20 of this invention. The welder 20 is composed of two separate parts that being an end fitting mounting housing 22 and a welding head housing 24. The welding head housing 24 includes a graspable handle section 26 which is fixedly secured to an enlarged head section 28. The head section 28 includes an enlarged centrally located recess 30. The recess 30 is of a special configuration and is adapted to matingly connect with half-cylinder member 32. Centrally located within the half-cylinder member 32 is a hole 34. Within the hole 34 there is mounted a welding electrode 36. The welding electrode 36 is to be fixedly mounted within the hole 34 by appropriate fastening means such as a set screw or the like.

The peripheral edge of the half-cylinder member 32 includes a series of gear teeth 38. These gear teeth 38 are to be in continuous engagement with a drive gear 40. The drive gear 40 is mounted within the upper end of the handle 26. It is to be understood that the drive gear 40 is to be driven by an appropriate motor (not shown) mounted within the handle 26 by electrical energy being supplied to the motor through a wire conducted through threaded end 42 of the handle 40. The wire supplying the electrical energy is not shown and is deemed to be conventional. Also, to be supplied through the threaded end 42 into the handle 26 is to be appropriate conduits for water cooling and inert gas. The inert gas is to be supplied within hole 34 to surround the welding electrode 36. Hole 34 is larger than electrode 36 forming an annular gas passage.

Formed within the half-cylinder member 32 is a half-circular recess 44. Connecting with the recess 44 and located in a slightly spaced position from the member 32 is a tube 46 that is to be welded. The end 48 of the tube 46 is to be joined by the welding process to an end fitting 50. The end 48 is to be matingly located within annular groove 52 of the end fitting 50. Both the tube 46 and the end fitting 50 will be of the same metallic material such as titanium.

Figure 1:
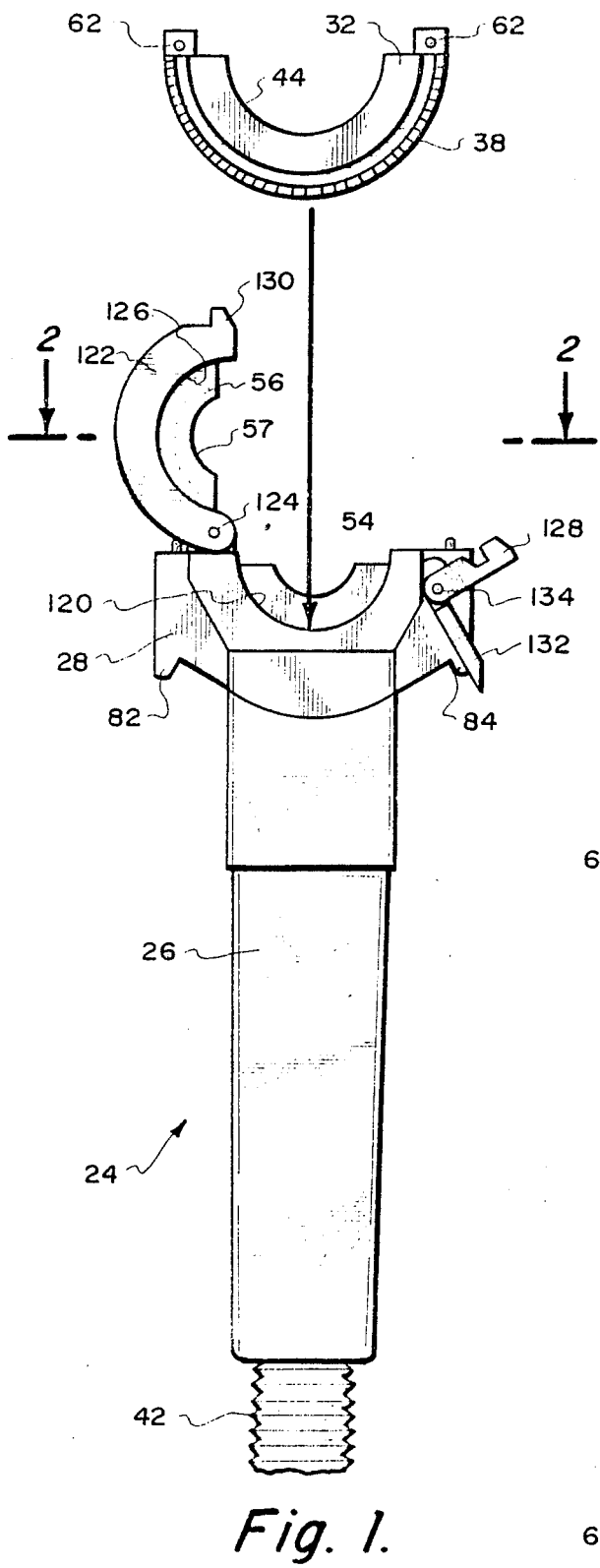
FIG. 1 is a side elevational view of the welding head housing of the welder of the present invention with a portion of the welding electrode driving mechanism being shown separate from the welding head housing.
Figure 2:
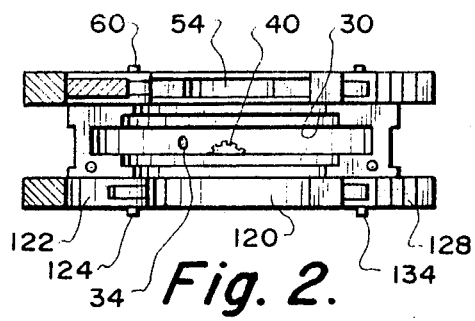
FIG. 2 is a top plan, partially cross-sectional, view of the welding head housing taken along line 2—2 of FIG. 1.
Figure 3:
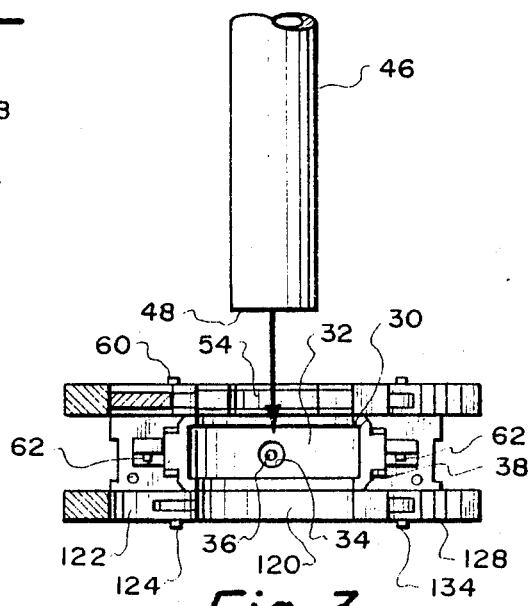
FIG. 3 is a view similar to FIG. 2 and depicting installing of the tube to be welded in conjunction with the welding head housing.
Figure 4:
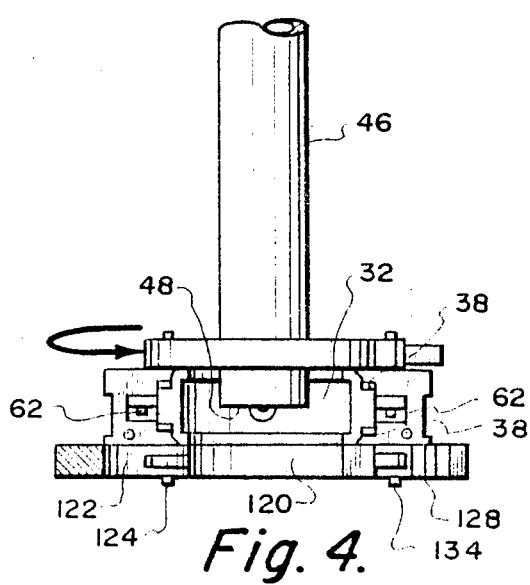
FIG. 4 is a view similar to FIG. 3 but showing the tube in the installed position.
Figure 5:
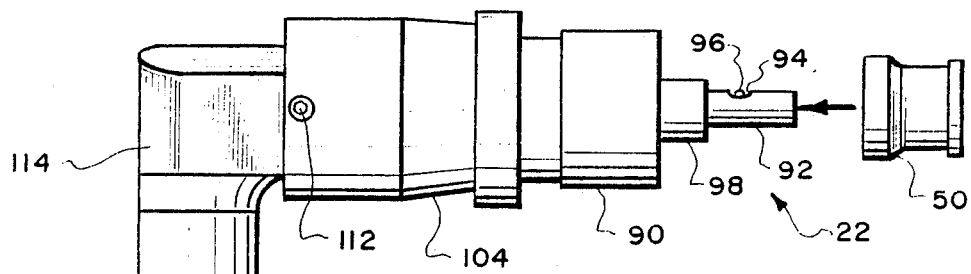
FIG. 5 is a side elevational view of the mounting housing included within the welder of the present invention showing the end fitting that is to be welded to the tube in an about ready to be installed position in conjunction with with the mounting housing.
Figure 6:
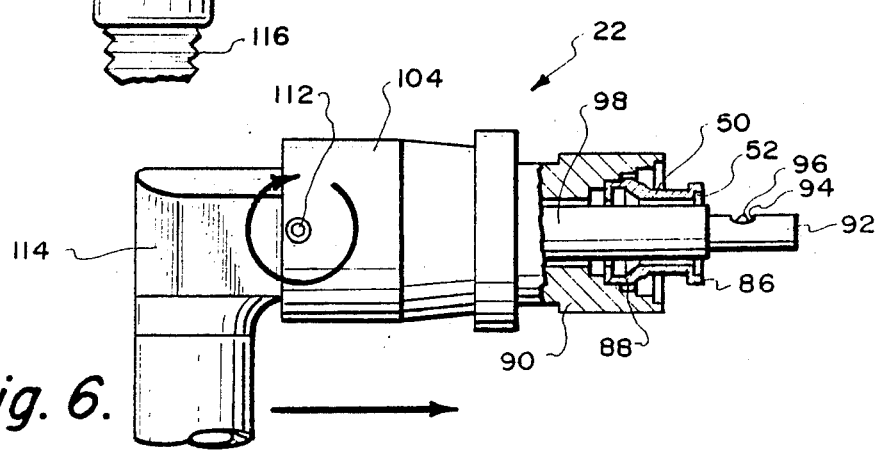
FIG. 6 is a view similar to FIG. 5, partly in cross-section, showing the end fitting in an installed position in conjunction with the mounting housing.
Figure 7:
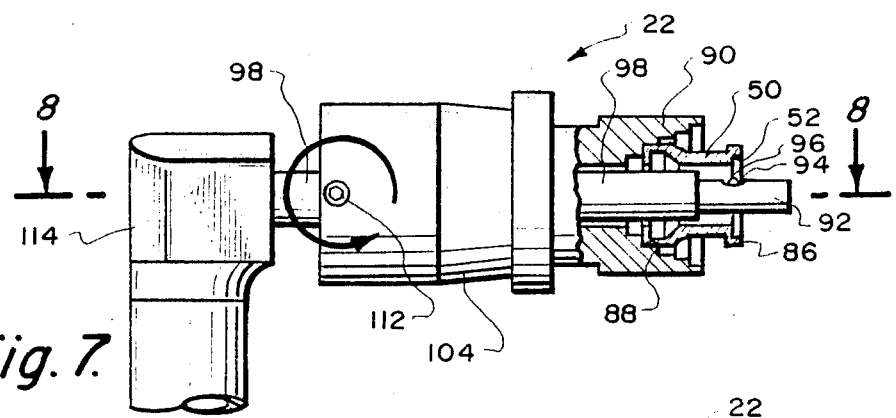
FIG. 7 is a view similar to FIG. 6 depicting the adjusting of the welding electrode so that it is located precisely at the welding joint.
Figure 8:
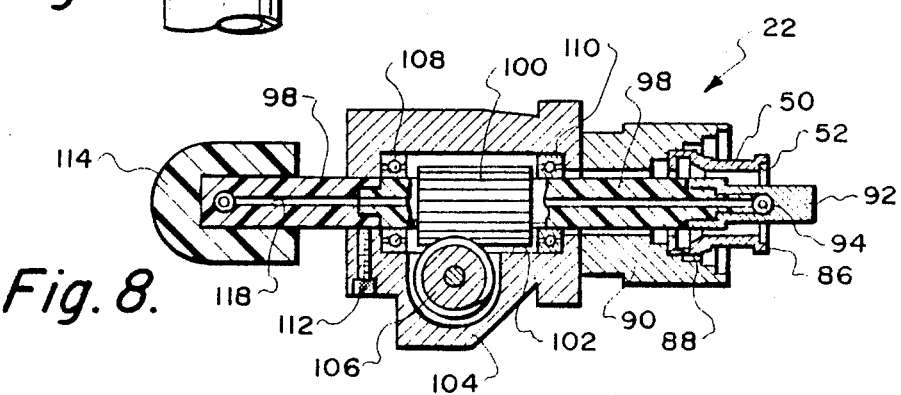
FIG. 8 is a cross-sectional view taken along 8—8 of FIG. 7.

The locating of the tube 56 in the spaced relationship from the wall of the recess 44 is by means of the clamping recess 54. Clamping recess 54 is formed within the enlarged head 28. Surrounding the upper end of the tube 46 and holding in tight engagement with the recess 54 is a clamping bar 56. The clamping bar 56 includes a centrally located recess 57 within which is to be located the tube 46. The recess 54 and the recess 57 cooperate together to snugly clamp onto the exterior surface of the tube 46 when the clamping bar 56 is pivoted from its open position shown in FIG. 1 to the closed clamping poistion shown in FIGS. 9 and 14 of the drawings. When in the closed clamping position the clamping bar 56 is locked in place by a pivotable toggle clamp 58. Clamping bar 56 is pivotally mounted by means of pin 60 to the enlarged head 28.

Member 32 includes a pair of diametrically located apart pins 62. These pins 62 are engaged with appropriate holes (not shown) formed within a member 64. With the pins 62 so engaged with the holes in the member 64, a continuous circular ring is formed by the members 32 and 64. Member 64 has a centrally disposed cavity 66 which is identical in size to the cavity 44. Member 64 also includes a gear 68 located at its peripheral edge. The gear 68 connects with the gear 38 to form a continuous ring gear. It is also to be noticed that there is such a ring gear formed on both the front and rear surfaces of the connected together members 32 and 64. The purpose of this is so as to provide for connection of the members 32 and 64 with enlarged head 28 in both positions one hundred eighty degrees apart thereby avoiding precise locating of the members 32 and 64 in the enlarged head 28.

Once the members 32 and 64 are connected together about the tube 46, a cover 70 is mounted about the members 64. The cover 70 is retained in position by deflectable spring member 72. The ends of the spring member 72 are formed into graspable levers 74 and 76. The portion of the spring member 72 adjacent lever 74 is formed into a pawl 78. The portion of the spring member 72 located adjacent the lever 76 is formed into a pawl 80. Pawl 78 is to engage with projection 82 with pawl 80 engaging with projection 84. The projections 82 and 84 are integrally formed on the enlarged head 28. It is to be understood that the principal reason for the cover 70 is to prevent any foreign object from becoming entangled with the members 32 and 64 as such is being rotated by the pinion gear 40. It is this rotation that causes the welding electrode 36 to be moved about the exterior surface of the welding joint which is formed at the inner end 86 of the end fitting 50.

The outer end of the end fitting 50 is to be matingly located within a receiving chamber 88 formed within a mounting block 90. It is to be noticed that the receiving chamber 88 is actually formed of a plurality of connected together annular recesses forming in essence an annular configuration. Each recess is to connect with a particular size of a particular diameter end fitting 50. As the diameter of end fitting varies, so does the length of the end fitting 50. The dealing with the length of the end fitting 50 is of major concern in utilizing the welder 20 of this invention as will now become apparent.

Located within the end fitting 50 is an electrically conductive shaft 92. This shaft 92 has a hole 94. Within the hole 94 is to be located a welding electrode 96. Hole 94 is larger in diameter than electrode 96 so insert gas can pass therethrough. The tip of the welding electrode 96 is to be located directly in alignment with the end 40 into the tube 46. In essence, the end 48 as well as end 86 cooperate together to form the welding joint.

The shaft 92 is fixed mounted within an insulative sleeve 98. Fixedly mounted on the sleeve 98 at its approximate mid-point is a pinion gear 100. This pinion gear 100 is mounted within enlarged chamber 102. Chamber 102 is formed within block 104 which is part of the mounting housing 22. Mounted for rotational movement within a portion of the chamber 102 is a worm gear 106. This worm gear 106 is to be rotationably driven from a motor (not shown) mounted within the block 104. The sleeve 98 is rotationally supported relative to the block 104 by means of bearings 108 and 110.

The block 104 includes a set screw 112. This set screw 112 is capable of being turned to engage with the sleeve 98. The aft end of the sleeve 98, as well as shaft 92, is fixedly mounted to a handle member 114 of the mounting housing 22. The outer end of handle 114 terminates in a threaded end 116 which is similar to threaded end 42. Through the threaded end 116 is to be conducted the electrically conductive wires (not shown) as well as conduits which supply inert gas and cooling water.

Block 104 abuts against and is fixed to block 90. When set screw 112 is loosened, blocks 104 and 90 are capable of a limited amount of sliding movement relative to the sleeve 98. During this sliding movement, the gear 106 slides on the gear 100. This sliding movement is so as to adjust the position of the welding electrode 96 so that it precisely aligns with the welding joint. Once the desired alignment is obtained the set screw 112 is tightened against the sleeve 98. It is to be noted that through the shaft 92 there is formed an inert gas passage 118 through which inert gas is to be supplied and discharged surrounding the welding electrode 96.

When the end fitting 50 is so mounted in conjunction with the receiving chamber 88 of a block 90, and the welding electrode 96 has been correctly positioned at the welding joint, block 90 is placed within recess 120 of enlarged head 28. A clamping bar 122, which is similar in appearance and operates similar to clamping bar 56, is to be placed over the block 90. The clamping bar 122 is pivotally mounted by means of a pin 124 to the enlarged head 28. The clamping bar 122 includes a centrally disposed recess 126 which closely conforms in a tight fitting manner about the block 90. When the clamping bar 122 is pivoted to the closed position shown in FIG. 14 of the drawings, the toggle clamp 128 is moved to engage with projection 130 thereby securing in place the clamping bar 122 on the enlarged head 28. Movement of the toggle clamp 128 is by means of handle 132. The toggle clamp 128 is pivotally supported by means of a pivot pin 134 to the enlarged head 28.

At this time with the welding electrodes 36 and 96 being correctly positioned at the welding joint, the welding process can now begin. It is to be understood that it is strictly the option of the user as to whether welding by the electrodes 36 and 96 is to occur simultaneously or sequentially, and if done sequentially, whether the electrode 36 is operated first or the electrode 96 is operated first.

After the welding is completed, it is to be understood that the clamping bars 56 and 122 are disengaged by respectively moving of the toggle clamps 128 and 58 from the now welded together end fitting 50 and tube 46. The welded tube 46 and end fitting 50 is now removed from the welder 20 of this invention.

What is claimed is:

1. A thick tube welder for welding a tubular end fitting onto a tube, said welder comprising:
   an end fitting mounting housing having a receiving chamber, said receiving chamber having a seat, said seat for locating the end fitting in a fixed position;
   an inner welding electrode assembly mounted on said end fitting mounting housing, said inner welding electrode assembly having an inner welding electrode, said inner welding electrode to be located within the end fitting in a spaced relationship from the interior wall of the end fitting;
   a welding head housing having an interior welding chamber, housing clamping means mounted on said welding head housing, said end fitting mounting housing to connect with said welding head housing with said housing clamping means fixing said end fitting mounting housing to said welding head housing;
   tube clamping means mounted on said welding head housing, said tube clamping means for fixing in position the tube to be welded in axial abutting alignment with the end fitting, the abutting of the tube and the end fitting forming a welding joint; and
   an outer welding electrode assembly mounted on said welding head housing, said outer welding electrode assembly having an outer welding electrode, said outer welding electrode to be located exteriorly of said welding joint.

2. The thick tube welder as defined in claim 1 wherein:
   said receiving chamber having a longitudinal center axis, said inner welding electrode being adjustable along said longitudinal center axis, upon said inner welding electrode being aligned with said welding joint said inner welding electrode to be then fixed in position relative to said end fitting mounting housing.

3. The thick tube welder as defined in claim 2 wherein:
   said inner welding electrode being rotatable mounted relative to said end fitting mounting housing.

4. The thick tube welder as defined in claim 3 wherein:
   said outer welding electrode being rotatable relative to said welding head housing.

* * * * *